(12) United States Patent
Ichikawa et al.

(10) Patent No.: US 6,767,518 B2
(45) Date of Patent: Jul. 27, 2004

(54) REFORMING APPARATUS

(75) Inventors: Hiroyuki Ichikawa, Kanagawa-ken (JP); Fuminori Yamanashi, Tokyo (JP); Masakazu Hanawa, Ibaraki-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 606 days.

(21) Appl. No.: 09/864,230

(22) Filed: May 25, 2001

(65) Prior Publication Data

US 2001/0047620 A1 Dec. 6, 2001

(30) Foreign Application Priority Data

Jun. 1, 2000 (JP) .................................... P2000-165098

(51) Int. Cl.[7] ................................................ C10J 3/68
(52) U.S. Cl. ..................................... 422/189; 48/127.9
(58) Field of Search ............................... 422/107, 108, 422/110, 111, 188, 189, 190, 191, 193, 194, 198, 211, 222, 236; 48/127.9, 61, 62, 128, 198.3, 198.7, 214 R, 215, 214 A (56) References Cited

U.S. PATENT DOCUMENTS

| | | | | |
|---|---|---|---|---|
| 4,789,540 A | | 12/1988 | Jenkins ..................... | 423/648.1 |
| 4,861,347 A | * | 8/1989 | Szydlowski et al. ........... | 48/61 |
| 6,190,623 B1 | * | 2/2001 | Sanger et al. ............... | 422/192 |
| 6,413,479 B1 | * | 7/2002 | Kudo et al. ................. | 422/198 |
| 6,455,008 B1 | * | 9/2002 | Aoyama et al. ............. | 422/108 |
| 2002/0040549 A1 | * | 4/2002 | Kondo et al. ................ | 48/61 |
| 2003/0000145 A1 | * | 1/2003 | Salemi et al. .......... | 48/199 FM |
| 2003/0003033 A1 | * | 1/2003 | Taguchi et al. ............. | 422/198 |
| 2003/0233789 A1 | * | 12/2003 | Dauer et al. ............... | 48/197 R |
| 2004/0009104 A1 | * | 1/2004 | Kaupert et al. ............. | 422/168 |

FOREIGN PATENT DOCUMENTS

| | | |
|---|---|---|
| EP | 0 921 585 A2 | 6/1999 |
| JP | 11-092102 | 4/1999 |
| WO | 99/31012 | 6/1999 |

OTHER PUBLICATIONS

Yamamoto, K., "Method for Starting Gas Reformer," Patent Abstracts of Japan, 6–305702, Nov. 1, 1994, (Abstract only).
Atsumi, T., "Fuel Reforming Catalyst," Patent Abstracts of Japan, 2000–042412, Feb. 15, 2000, (Abstract only).

* cited by examiner

*Primary Examiner*—Kiley Stoner
*Assistant Examiner*—Jonathan Johnson
(74) *Attorney, Agent, or Firm*—Foley & Lardner LLP (57) ABSTRACT

A fuel reforming apparatus quickly heats the temperature of a catalyst to an activation temperature to shorten a startup time. The apparatus supplies a hydrocarbon fuel and an oxidizer upstream from a second catalyst (2), and steam upstream from a first catalyst (1). The second catalyst starts a rapid oxidation reaction to generate a high-temperature gas which heats the first catalyst. When the apparatus changes a startup operation or an accelerating operation to a steady operation after a predetermined period, the apparatus supplies the hydrocarbon fuel and steam upstream from the second catalyst, and the oxidizer upstream from the first catalyst. As a result, the second catalyst starts a steam reforming reaction to absorb heat from the second catalyst. And the second catalyst rapidly cools to stop reactions and pass the hydrocarbon fuel and steam with out reactions. Then, a hydrogen-rich reformed gas is generated from the passed hydrocarbon fuel and steam.

15 Claims, 12 Drawing Sheets

TEMPERATURE OF CATALYST (2)

REFORMING APPARATUS

BACKGROUND OF THE INVENTION

1. Field of the Invention

The present invention relates to a fuel reforming apparatus that simultaneously achieves a steam reforming reaction to produce hydrogen from a hydrocarbon and steam and a partial oxidation reaction to produce hydrogen from a hydrocarbon and an oxidizer and uses heat generated by the partial oxidation reaction that is an exothermic reaction to cover heat for the steam reforming reaction that is an endothermic reaction.

2. Description of the Related Art

An example of a methanol reforming apparatus for a fuel cell is disclosed in Japanese Unexamined Patent Publication No. 11-092102. An object of this apparatus is to spatially equalize a temperature distribution in a fuel cell reforming apparatus. The sixth and seventh embodiments of the disclosure temporally change an oxidizer feeding position with respect to a catalyst, to prevent a local temperature increase in the catalyst due to a continuous localized oxidation reaction, promote an internal oxidation reaction, and shorten a startup time.

This prior art intentionally prevents a localized oxidation reaction, which is an exothermic reaction, and spatially disperses heat produced by the oxidation reaction. Accordingly, the prior art needs a large amount of fuel and time to increase the temperature of a catalyst to an activation level, and therefore, is incapable of shortening a startup time.

If a part of a catalyst is heated to an activation temperature on startup, the surface of the catalyst starts a chemical reaction to generate heat, which causes a chain reaction of heating the periphery of the heated part of the catalyst, thereby promoting reactions. Therefore, to shorten a startup time, it is necessary to quickly heat, even locally, a catalyst to an activation temperature. The prior art, however, pays no attention to this point.

SUMMARY OF THE INVENTION

An object of the present invention is to provide a fuel reforming apparatus capable of quickly heating a catalyst to an activation temperature and shortening a startup time.

In order to accomplish the object, a first aspect of the present invention provides a fuel reforming apparatus that supplies, on startup, a hydrocarbon fuel and an oxidizer upstream from a second catalyst and supplies steam upstream from a first catalyst. As a result, the second catalyst starts a rapid oxidation reaction to produce a high-temperature gas, which quickly heats the first catalyst that is downstream of the second catalyst. At the same time, carbon monoxide (CO) produced on the second catalyst reaches the first catalyst and reacts (a shift reaction which is an exothermic reaction) with steam on the first catalyst to promote the heating of the first catalyst. At this time, carbon monoxide produced on the second catalyst is purified into carbon dioxide through a shift reaction on the first catalyst.

To change the startup operation (or an accelerating operation) to a steady operation after a predetermined period, the apparatus supplies the hydrocarbon fuel and steam upstream from the second catalyst and supplies the oxidizer upstream from the first catalyst. As a result, a steam reforming reaction, which is an endothermic reaction, occurs on the second catalyst, to rapidly cool the second catalyst and stop reactions on the second catalyst. The hydrocarbon fuel and steam passed through the second catalyst without reactions cause a partial oxidation reaction and steam reforming reaction on the first catalyst that is downstream of the second catalyst, to generate a hydrogen-rich reformed gas.

With these processes, the fuel reforming apparatus of the first aspect shortens a startup time, minimizes the poisoning of a fuel cell arranged downstream of the fuel reforming apparatus, and suppresses the generation of by-products that may deteriorate the quality of emissions.

A second aspect of the present invention uses a temperature measured around the first catalyst as a parameter to determine whether or not a startup operation or an accelerating operation must be changed to a steady operation. This smoothly changes a startup operation or an accelerating operation to a steady operation while suppressing the generation of by-products.

A third aspect of the present invention employs an integrated material feeder for each of the first and second catalysts, to feed an oxidizer and steam to the catalysts. This aspect simplifies the structure of the fuel reforming apparatus.

A fourth aspect of the present invention applies the fuel reforming apparatus of the present invention to a fuel cell system using methanol as a fuel.

A fifth aspect of the present invention employs an oxidation catalyst, which is commonly available, to improve the durability of the fuel reforming apparatus and reduce the cost thereof.

DESCRIPTION OF THE PREFERRED EMBODIMENT

First embodiment

Figure 1:
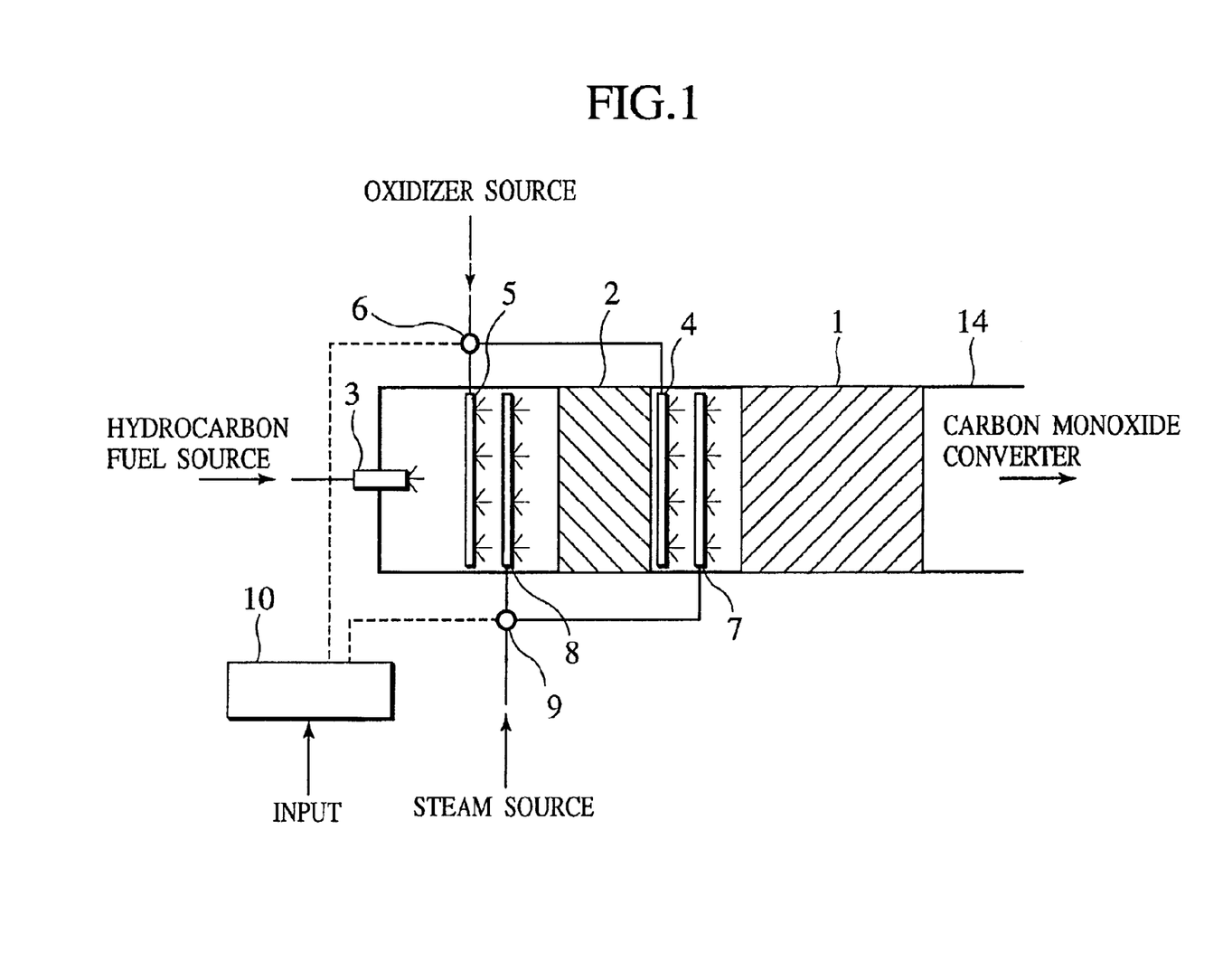
FIG. 1 is a sectional view showing a fuel reforming apparatus according to a first embodiment of the present invention.

FIG. 1 is a sectional view showing a fuel reforming apparatus according to the first embodiment of the present invention. A catalyst(1) 1 with a support promotes a steam reforming reaction and a partial oxidation reaction mainly in a steady operation. The catalyst(1) 1 is, for example, a copper-based catalyst or a palladium-based catalyst and is densely arranged without a gap in a downstream area of a reactor casing 14. A catalyst(2) 2 with a support promotes a partial oxidation reaction mainly in a startup operation or in a transient (accelerating) operation under increasing load. The catalyst(2) 2 is, for example, a copper-based catalyst, a palladium-based catalyst, or an oxidation catalyst and is densely arranged without a gap on the upstream side of the catalyst(1) 1. A fuel feeder 3 receives a hydrocarbon fuel such as methanol from a fuel source (not shown) and sprays or injects the fuel toward the catalyst(2) 2 that is downstream of the fuel feeder 3. The fuel feeder 3 is positioned upstream from the catalyst(2) 2 and is fitted to the casing 14.

An oxidizer feeder(1) 4 receives an oxidizer from an oxidizer source (not shown) and distributes the oxidizer as uniformly as possible into a gas passage formed between the catalyst(1) 1 and the catalyst(2) 2 in the casing 14. The oxidizer feeder(1) 4 is fitted to the casing 14. An oxidizer feeder(2) 5 receives the oxidizer from the oxidizer source (not shown) and distributes the oxidizer as uniformly as possible into a gas passage formed on the upstream side of the catalyst(2) 2 in the casing 14. The oxidizer feeder(2) 5 is fitted to the casing 14. An oxidizer control valve 6 switches the oxidizer supplied 40 from the oxidizer source (not shown) to any one of the oxidizer feeders (1) 4 and (2) 5. The oxidizer control valve 6 is installed in the middle of piping that connects the oxidizer source to the oxidizer feeders(1) 4 and (2) 5.

A steam feeder(1) 7 receives steam from a steam source (not shown) and distributes the steam as uniformly as possible into the gas passage formed between the catalyst(1) 1 and the catalyst(2) 2 in the casing 14. The steam feeder(1) 7 is fitted to the casing 14. A steam feeder(2) 8 receives the steam from the steam source (not shown) and distributes the steam as uniformly as possible into the gas passage formed on the upstream side of the catalyst(2) 2 in the casing 14. The steam feeder(2) 8 is fitted to the casing 14. A steam control valve 9 switches steam supplied from the steam source (not shown) to any one of the steam feeders (1)7 and (2)8. The steam control valve 9 is installed in the middle of piping that connects the steam source to the steam feeders (1)7 and (2)8.

A controller 10 is connected to the oxidizer control valve 6 and steam control valve 9 through signal lines, to separately control the valves 6 and 9.

Figure 2:
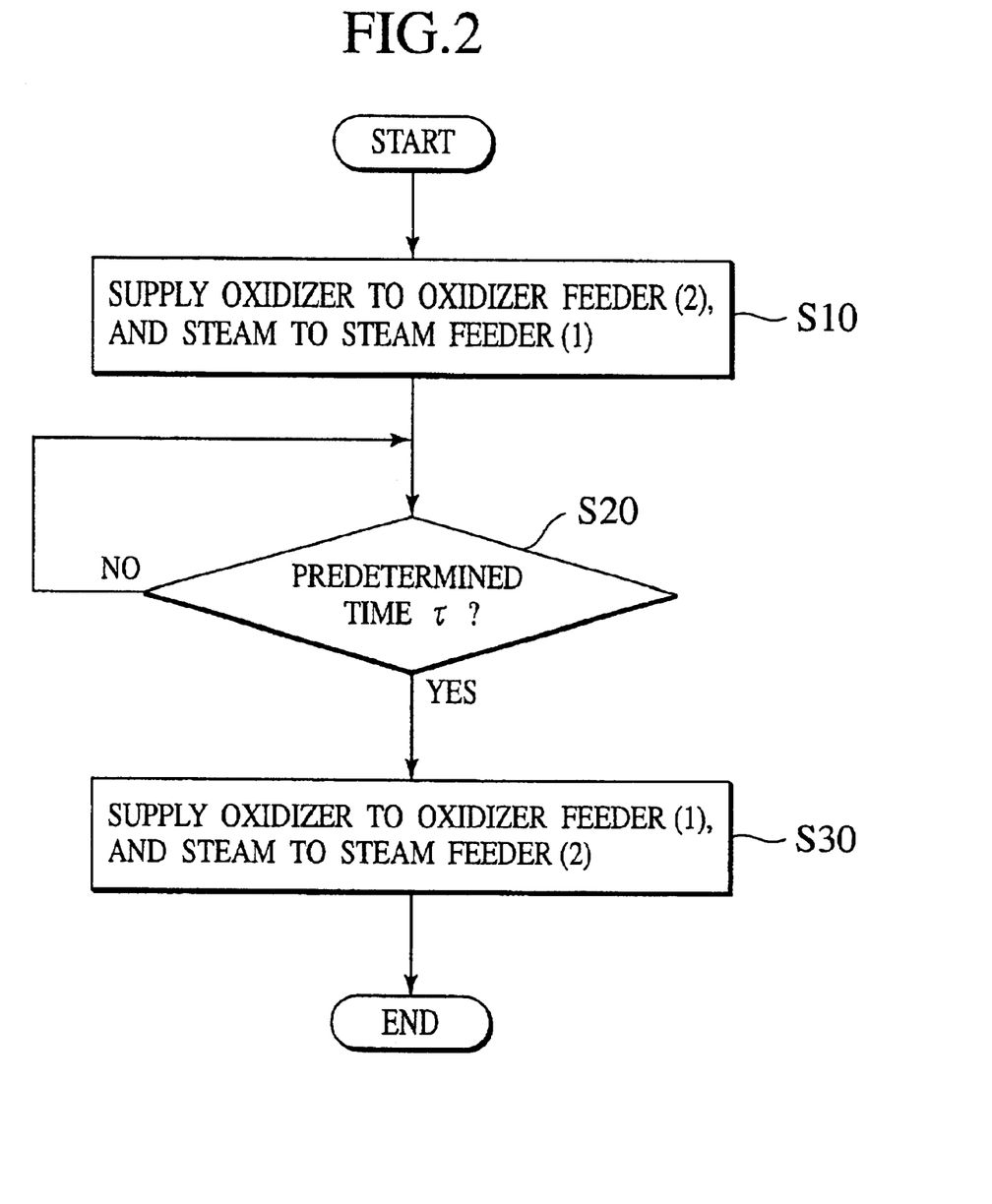
FIG. 2 is a flowchart showing a control operation according to the first embodiment.

A control operation of the fuel reforming apparatus according to the first embodiment will be explained with reference to FIG. 2.

In response to an external start signal or acceleration signal, the control flow starts.

A. Accelerating operation

Step S10 corresponds to a startup operation or an accelerating operation (transient operation) under increasing load. The controller 10 sends a switching signal to the oxidizer control valve 6 so as to connect the oxidizer source to the oxidizer feeder(2) 5. At the same time, the controller 10 issues a switching signal to the steam control valve 9 so as to connect the steam source to the steam feeder(1) 7.

As a result, adjusted quantities of hydrocarbon fuel, oxidizer, and steam are supplied to the fuel reforming apparatus. Due to the hydrocarbon fuel and oxidizer supplied from the upstream side, the catalyst(2) 2 starts an oxidation reaction (partial) to rapidly generate heat to increase the temperature of the catalyst(2) 2. This oxidation reaction generates a gas that heats the downstream catalyst (1) 1. Due to carbon monoxide produced by the oxidation reaction on the catalyst(2) 2 and the steam supplied from the upstream side, the catalyst(1) 1 starts a shift reaction to heat the catalyst(1) 1 itself. This shift reaction on the catalyst(1) 1 purifies the carbon monoxide generated by the catalyst(2) 2 into carbon dioxide and hydrogen.

Step S20 determines whether or not a predetermined time τ has passed under the state of step S10. If the time τ has passed, step S30 is carried out, and if not, the state of step S10 is continued. The time τ is determined to sufficiently bring the temperature of the catalyst(1) 1 to a threshold temperature Tc at which the catalyst(1) 1 stably achieves a steam reforming reaction and partial oxidation reaction.

B. Steady operation

In step S30, the controller 10 issues a switching signal to the oxidizer control valve 6 so as to connect the oxidizer source to the oxidizer feeder(1)4. At the same time, the controller 10 provides a switching signal to the steam control valve 9 so as to connect the steam source to the steam feeder(2) 8.

Due to the hydrocarbon fuel and steam supplied from the upstream side, the catalyst(2) 2 starts a steam reforming reaction, which is an endothermic reaction to decrease the temperature of the catalyst(2) 2 and stop all reactions on the catalyst(2) 2. As a result, the hydrocarbon fuel and steam supplied from the upstream side of the catalyst(2) 2 pass through the catalyst(2) 2 without reactions and reach the catalyst(1) 1. Due to the hydrocarbon fuel and steam passed through the catalyst(2) 2 and the oxidizer supplied from the upstream side, the catalyst(1) 1 promotes a steam reforming reaction and partial oxidation reaction to generate a hydrogen-rich reformed gas. This completes a series of processes.

Figure 3A:
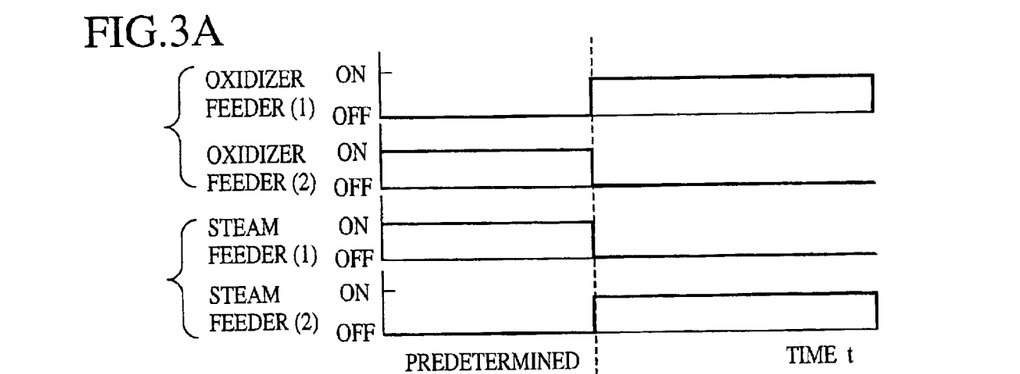
FIG. 3A shows temporal changes in the flows of oxidizer and steam according to the first embodiment.
Figure 3B:
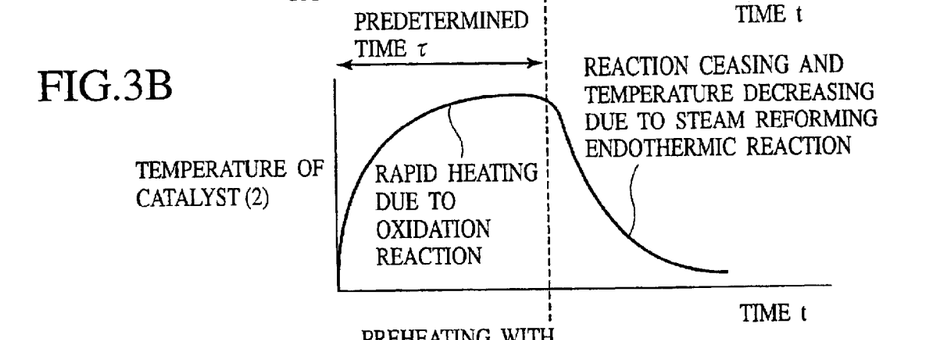
FIG. 3B shows temporal changes in the temperature of a catalyst(2) according to the first embodiment.
Figure 3C:
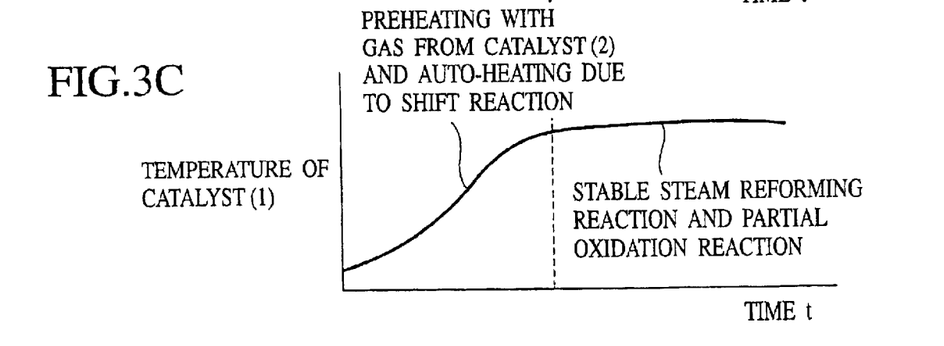
FIG. 3C shows temporal changes in the temperature of a catalyst(1) according to the first embodiment.

FIGS. 3A to 3C show temporal changes in the supply of oxidizer and steam and temporal changes in the temperatures of the catalysts (1) and (2) in the fuel reforming apparatus of the first embodiment. In FIG. 3A, "ON" is an oxidizer or steam source connected state and "OFF" a source disconnected state. The fuel reforming apparatus of the first embodiment quickly promotes an oxidation reaction (partial) on the catalyst(2) to speedily heat the catalyst(1). Generated carbon monoxide reacts with steam on the catalyst(1) to start a shift reaction. Consequently, the first embodiment reduces a startup time, minimizes the poisoning of a fuel cell arranged on the downstream side of the fuel reforming apparatus, and suppresses the generation of by-products that deteriorate the quality of emissions.

Second embodiment

Figure 4:
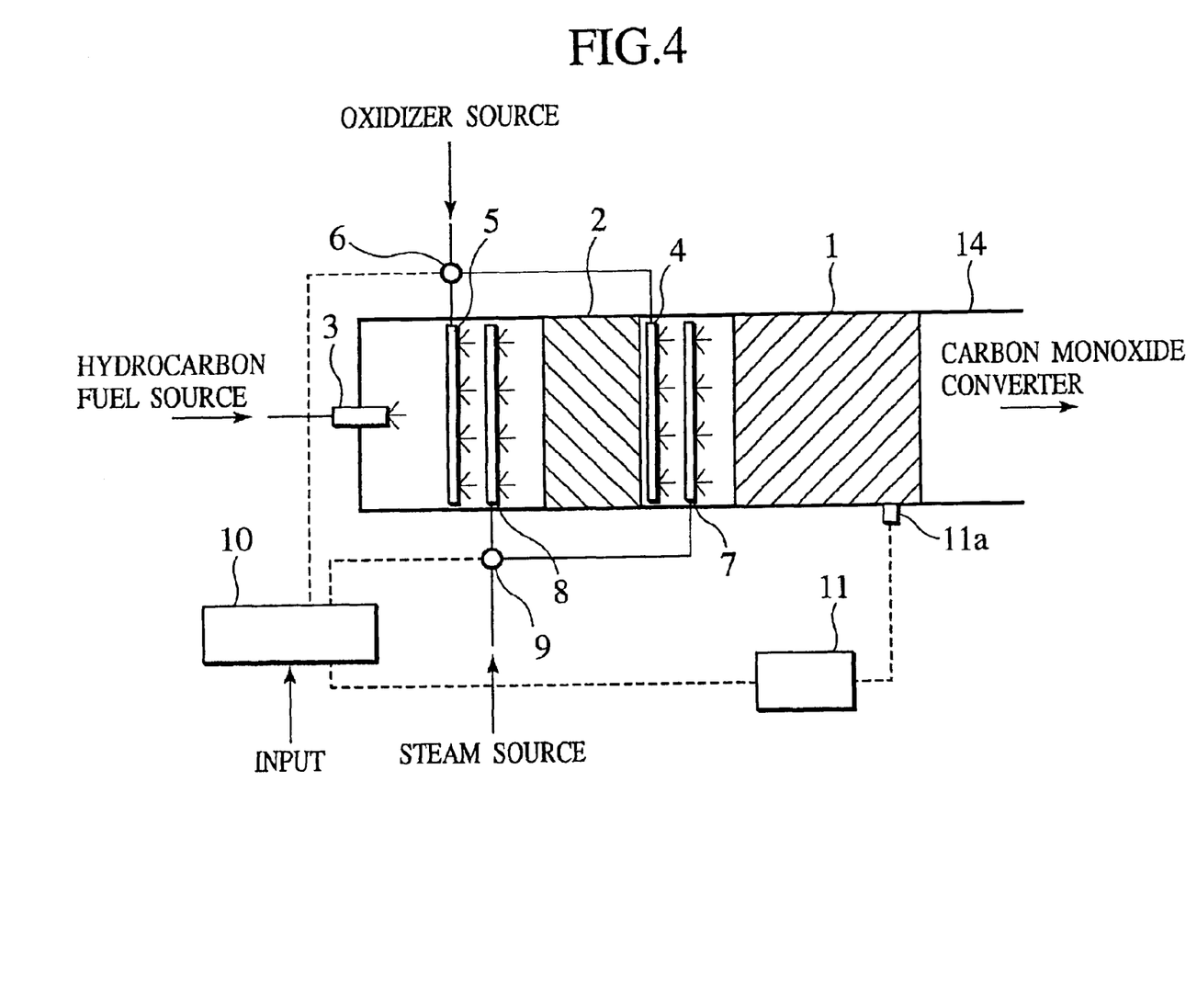
FIG. 4 is a sectional view showing a fuel reforming apparatus according to a second embodiment of the present invention.

FIG. 4 is a sectional view showing a fuel reforming apparatus according to the second embodiment of the present invention. The structure of the second embodiment is basically the same as that of the first embodiment and differs therefrom in that a temperature measuring unit 11 is connected to a controller 10 and a temperature sensor 11a is fitted to a reactor casing 14 in the vicinity of a catalyst(1) 1, to measure a temperature around the catalyst(1) 1. Data measured by the temperature measuring unit 11 is sent to the controller 10.

Figure 5:
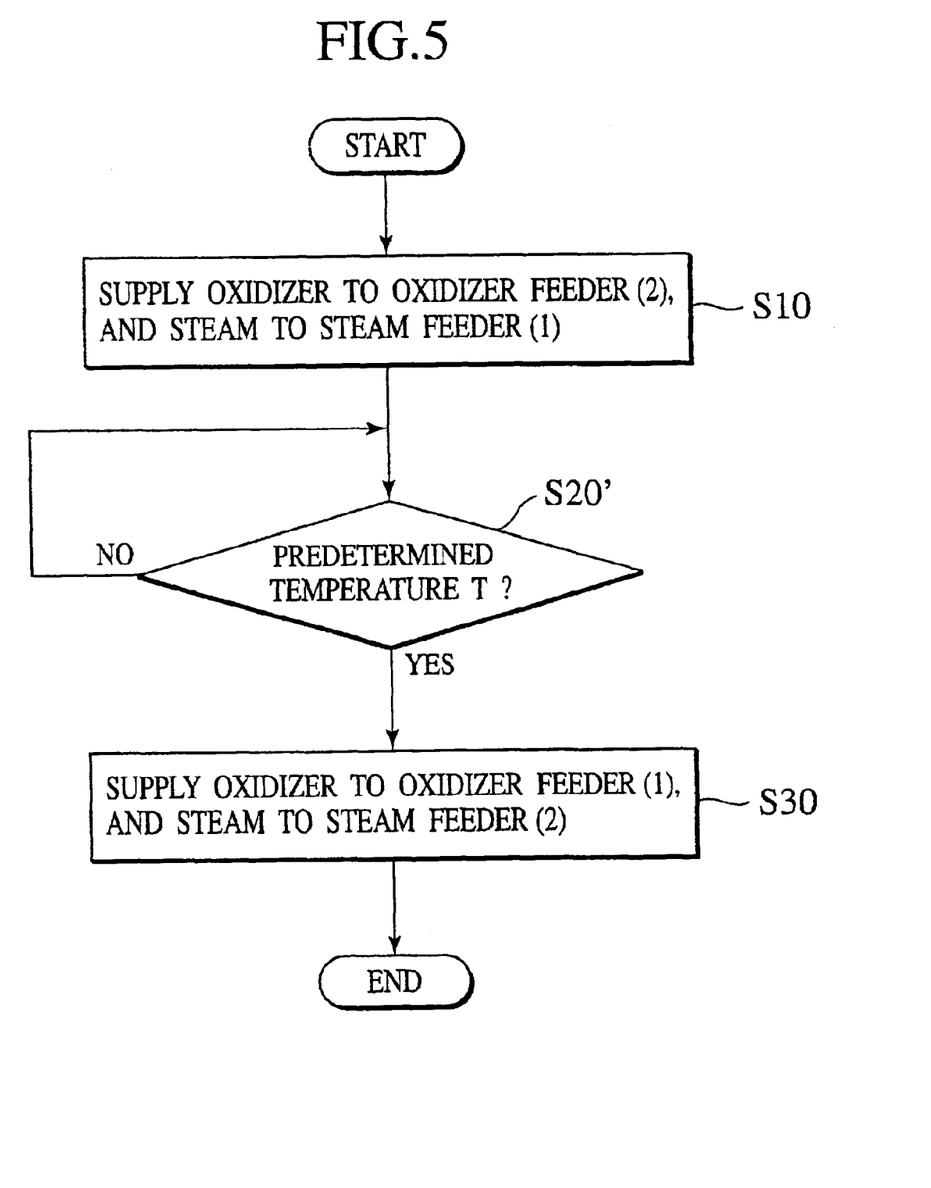
FIG. 5 is a flowchart showing a control operation according to the second embodiment.

A control operation of the fuel reforming apparatus of the second embodiment will be explained with reference to FIG. 5. The control operation of the second embodiment is basically the same as that of the first embodiment of FIG. 2, and therefore, only the difference of the second embodiment from the first embodiment will be explained.

Step S20' uses a signal from the temperature measuring unit 11 to determine whether or not a temperature around the catalyst(1) 1 has reached to a predetermined temperature τ. If it has reached the value τ, step S30 is carried out, and if not, the state of step S10 is maintained. The temperature τ is based on a threshold temperature Tc at which the catalyst (1) 1 stably achieves a steam reforming reaction and partial oxidation reaction. During an accelerating operation, the temperature of the catalyst(1) 1 transiently changes, and therefore, it is possible to estimate the temperature of the catalyst(1) 1 according to temporal changes in temperatures around the catalyst(1) 1, to correctly determine the timing of switching to a steady operation. It is also possible to check the threshold temperature Tc based on temperature data measured at different locations, which will be explained later.

Figure 6A:
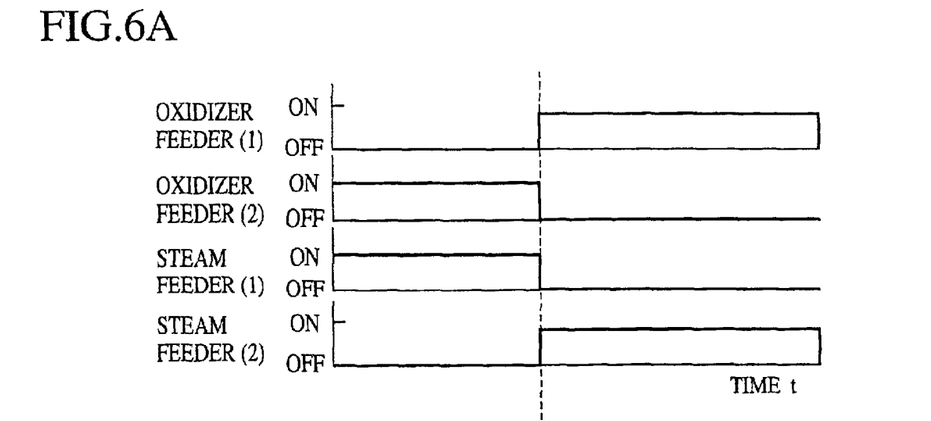
FIG. 6A shows temporal changes in the flows of oxidizer and steam according to the second embodiment.
Figure 6B:
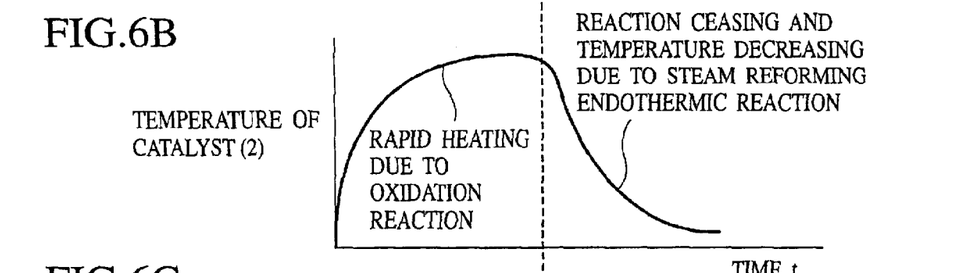
FIG. 6B shows temporal changes in the temperature of a catalyst(2) according to the second embodiment.
Figure 6C:
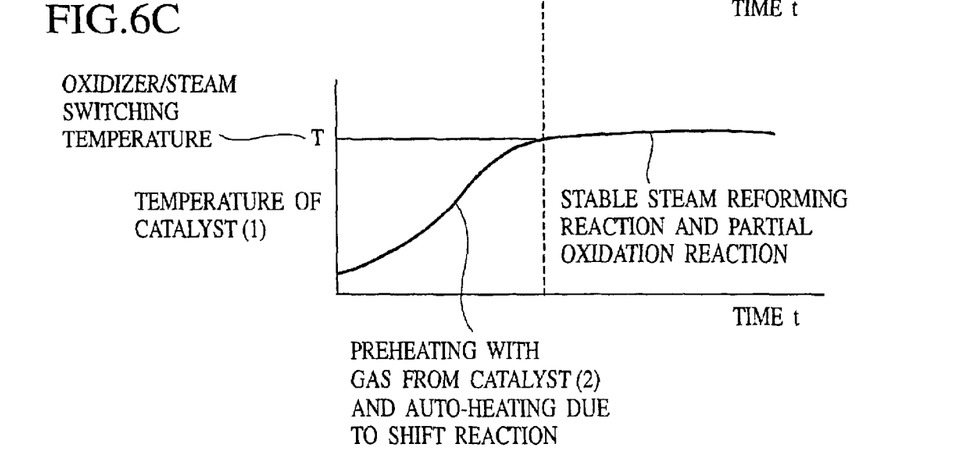
FIG. 6C shows temporal changes in the temperature of a catalyst(1) according to the second embodiment.

FIGS. 6A to 6C show temporal changes in the supply of oxidizer and steam and temporal changes in the temperatures of the catalysts (1) and (2) in the fuel reforming apparatus of the second embodiment. In FIG. 6A, a status being connected to a corresponding material source is depicted as "ON", and disconnected thereto as "OFF". The fuel reforming apparatus of the second embodiment uses a temperature measured in the vicinity of the catalyst(1) as a parameter to determine whether or not a steady operation must be started. In addition to the effect of the first embodiment, the second embodiment further shortens a startup time and smoothly changes a startup operation or an accelerating operation to a steady operation while suppressing the generation of by-products.

Third embodiment

Figure 7:
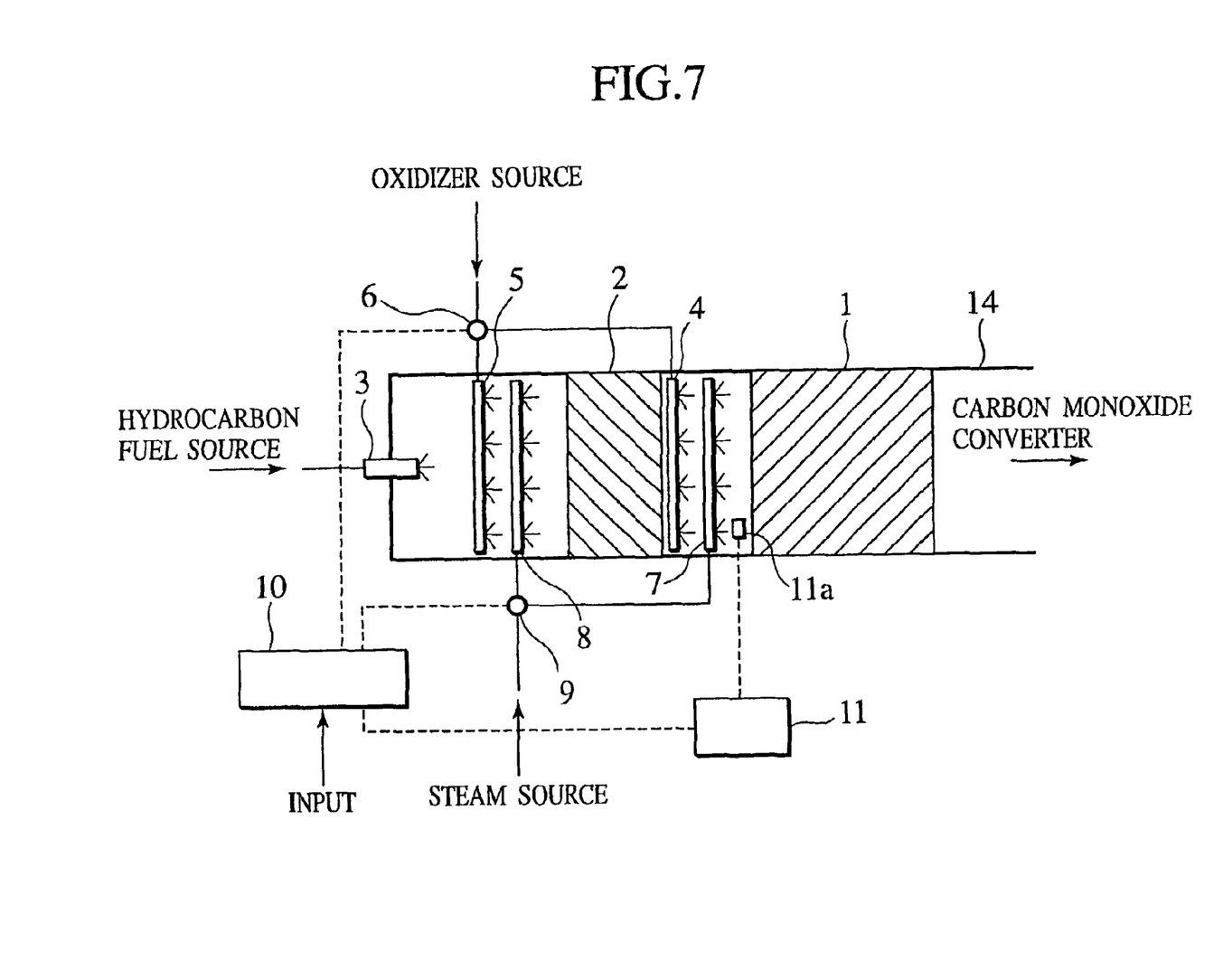
FIG. 7 is a sectional view showing a fuel reforming apparatus according to a third embodiment of the present invention.

FIG. 7 is a sectional view showing a fuel reforming apparatus according to the third embodiment of the present invention. The structure of the third embodiment is basically the same as that of the second embodiment of FIG. 4 and differs therefrom in that a temperature sensor 11a is fitted to a reactor casing 14 at a position in a gas passage defined in the casing 14 on the upstream side of a catalyst(1) 1, to detect a gas temperature on the upstream side of the catalyst (1) 1. The temperature sensor 11a is connected to a temperature measuring unit 11, which sends temperature data to a controller 10.

A control operation of the third embodiment is basically the same as that of the second embodiment. In addition to the operation and effect of the second embodiment, the third embodiment directly measures the temperature of a gas sent from a catalyst(2) 2, to speedily determine the timing of changing a startup operation or an accelerating operation to a steady operation, thereby further reducing a startup time.

Fourth embodiment

Figure 8:
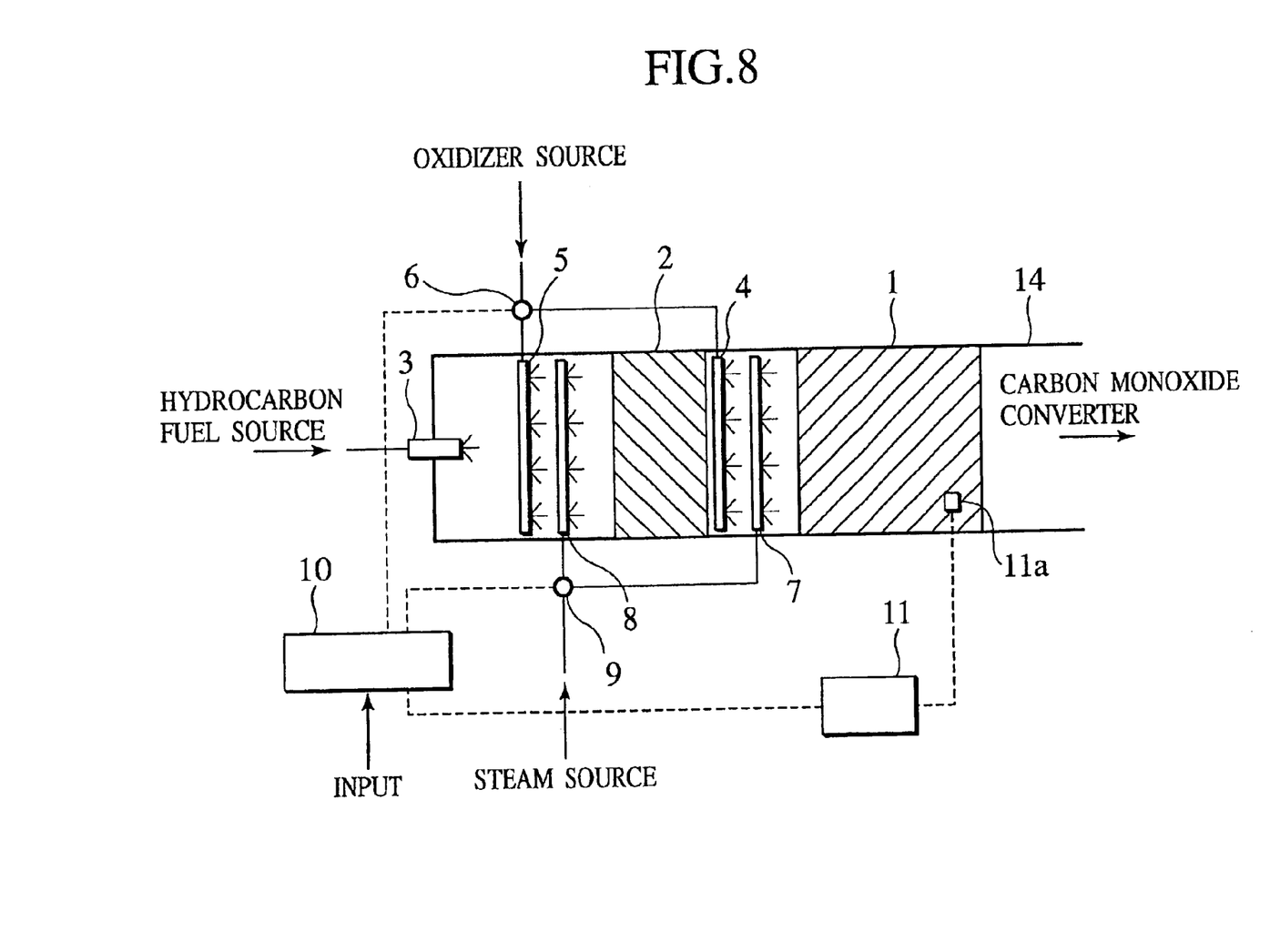
FIG. 8 is a sectional view showing a fuel reforming apparatus according to a fourth embodiment of the present invention.

FIG. 8 is a sectional view showing a fuel reforming apparatus according to the fourth embodiment of the present invention. The structure of the fourth embodiment is basically the same as that of the second embodiment of FIG. 4 and differs therefrom in that a temperature sensor 11a is inserted into a catalyst(1) 1 and is fitted to a reactor casing 14, to detect an inside temperature of the catalyst(1) 1. The temperature sensor 11a is connected to a temperature measuring unit 11, which sends temperature data to a controller 10.

A control operation of the fourth embodiment is basically the same as that of the second embodiment. In addition to the operation and effect of the second embodiment, the fourth embodiment directly detects an internal temperature of the catalyst(1) 1, to surely change a startup operation or an accelerating operating to a steady operation without extinction.

Fifth embodiment

Figure 9:
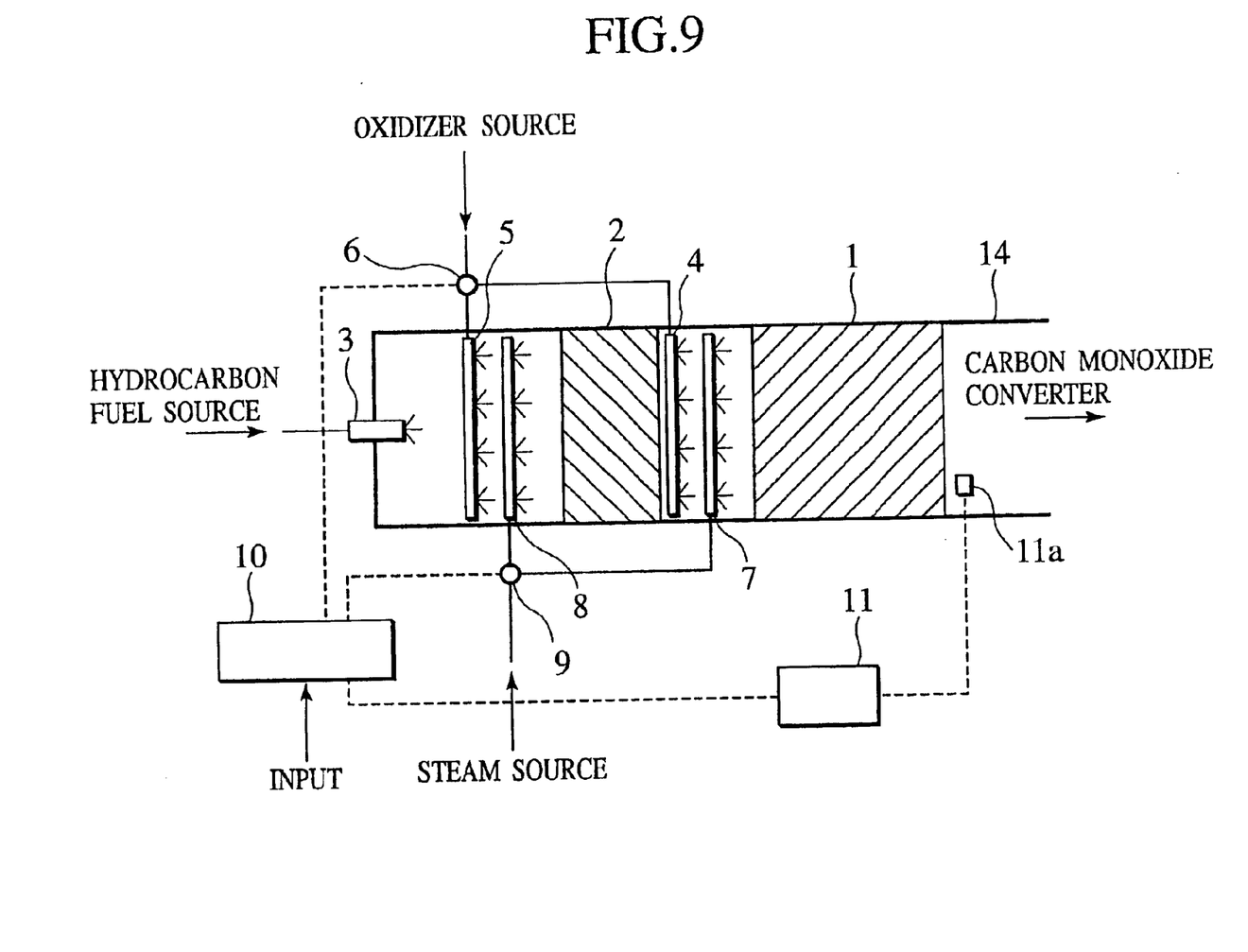
FIG. 9 is a sectional view showing a fuel reforming apparatus according to a fifth embodiment of the present invention.

FIG. 9 is a sectional view showing a fuel reforming apparatus according to the fifth embodiment of the present invention. The structure of the fifth embodiment is basically the same as that of the second embodiment of FIG. 4 and differs therefrom in that a temperature sensor 11a is fitted to a reactor casing 14 at a position in a gas passage defined in the casing 14 on the downstream side of a catalyst(1) 1, to detect a gas temperature on the downstream side of the catalyst(1) 1. The temperature sensor 11a is connected to a temperature measuring unit 11, which sends temperature data to a controller 10.

A control operation of the fifth embodiment is basically the same as that of the second embodiment. In addition to the operation and effect of the second embodiment, the fifth embodiment measures a gas temperature on the downstream side of the catalyst(1) 1. Since the downstream side temperature is relatively low, the temperature sensor 11a and temperature measuring unit 11 of the fifth embodiment may extend durability and inexpensive to reduce costs.

Sixth embodiment

Figure 10:
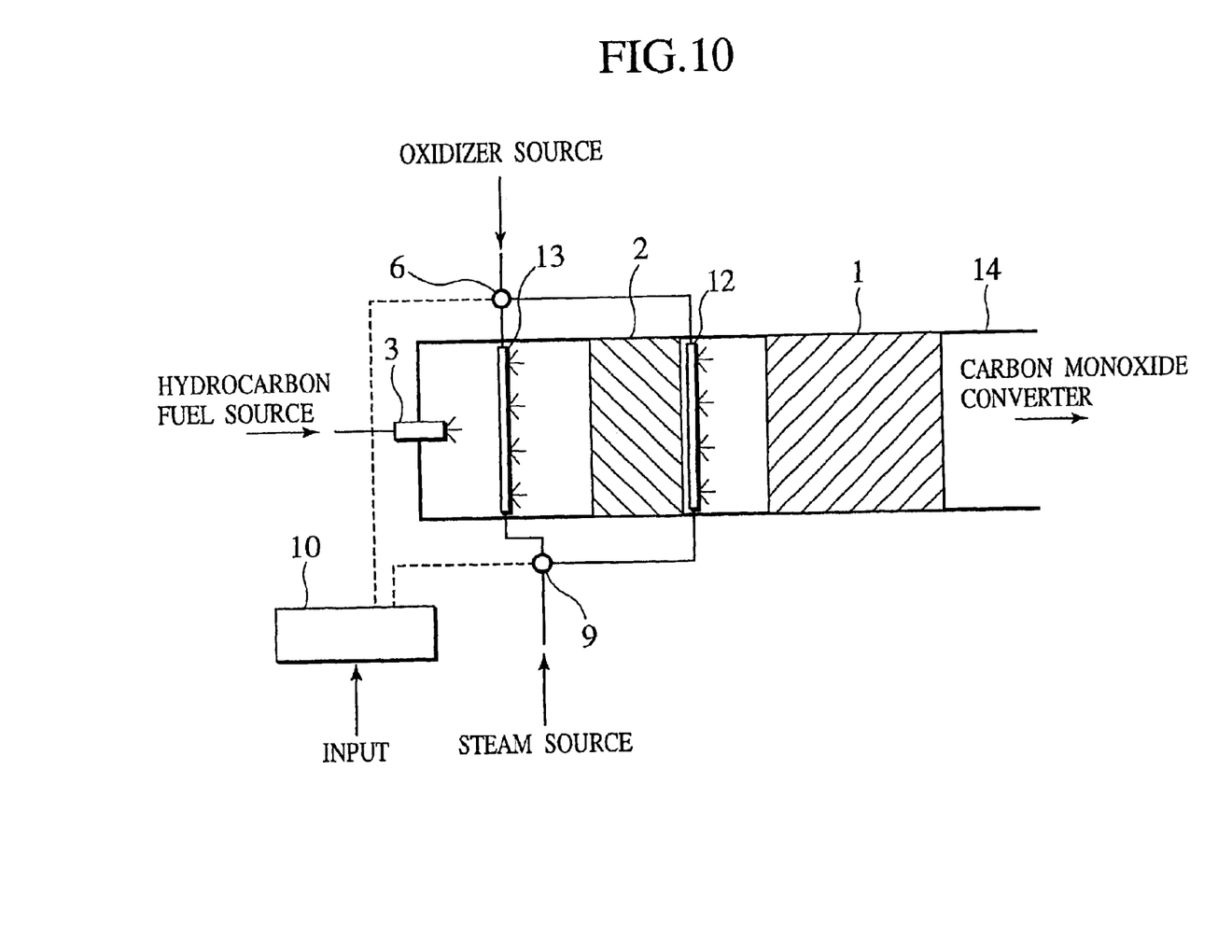
FIG. 10 is a sectional view showing a fuel reforming apparatus according to a sixth embodiment of the present invention.

FIG. 10 is a sectional view showing a fuel reforming apparatus according to the sixth embodiment of the present invention. The structure of the sixth embodiment is basically the same as that of the first embodiment of FIG. 1 and differs therefrom in that the sixth embodiment employs a material feeder(1) 12 and a material feeder(2)13. The material feeder (l) 12 is fitted to a reactor casing 14, to receive an oxidizer from an oxidizer source (not shown), or steam from a steam source (not shown) and distribute the received material as uniformly as possible into a passage defined in the casing 14 between a catalyst(1) 1 and a catalyst(2) 2. The material feeder(2) 13 is fitted to the casing 14, to receive one of the oxidizer from the oxidizer source and the steam from the steam source and distribute the received material as uniformly as possible into a passage defined in the casing 14 on the upstream side of the catalyst(2) 2.

Figure 11:
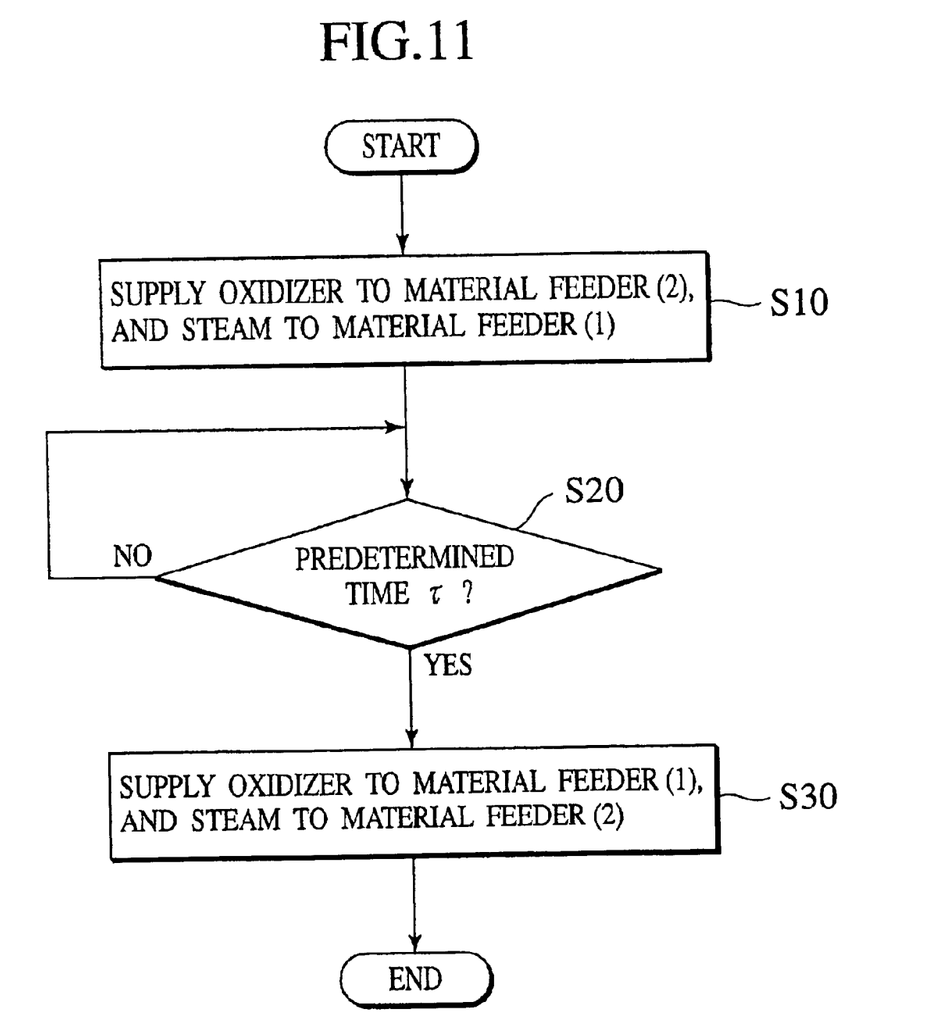
FIG. 11 is a flowchart showing a control operation according to the sixth embodiment.

A control operation of the fuel reforming apparatus of the sixth embodiment will be explained with reference to FIG. 11. This operation is basically the same as that of the first embodiment of FIG. 2, and therefore, only the difference of the sixth embodiment from the first embodiment will be explained.

A. Accelerating operation

In step S10, a controller 10 issues a signal to an oxidizer control valve 6 to connect the oxidizer source to the material feeder (2) 13. At the same time, the controller 10 issues a signal so as to a steam control valve 9 to connect the steam source to the material feeder(1) 12. As a result, adjusted quantities of hydrocarbon fuel, oxidizer, and steam are supplied to the fuel reforming apparatus. Due to the hydrocarbon fuel and oxidizer supplied from the upstream side, the catalyst(2) 2 starts an oxidation reaction (partial) to rapidly generate heat to increase the temperature of the catalyst(2) 2. This oxidation reaction produces a gas that heats the downstream catalyst(1) 1. At the same time, due to carbon monoxide produced by the oxidation reaction on the catalyst(2) 2 and the steam supplied from the upstream side, the catalyst(1) 1 starts a shift reaction to heat the catalyst(1) 1 itself. This shift reaction on the catalyst(1) 1 purifies the carbon monoxide generated by the catalyst(2) 2 into carbon dioxide and hydrogen.

Step S20 determines whether or not a predetermined time τ has passed under the state of step S10. If the time τ has passed, step S30 is carried out, and if not, the state of step S10 is continued.

B. Steady operation

In step S30, the controller 10 issues a signal to the oxidizer control valve 6 to connect the oxidizer source to the material feeder(1) 12. At the same time, the controller 10 issues a signal to the steam control valve 9 so as to connect the steam source to the material feeder(2)13. Due to the hydrocarbon fuel and steam supplied from the upstream side, the catalyst(2) 2 starts a steam reforming reaction, which is an endothermic reaction to decrease the temperature of the catalyst(2) 2 and stop all reactions on the catalyst(2) 2. As a result, the hydrocarbon fuel and steam supplied from the upstream side of the catalyst(2) 2 pass through the catalyst(2) 2 without reactions and reach the catalyst(1) 1.

Due to the hydrocarbon fuel and steam passed through the catalyst(2) 2 and the oxidizer supplied from the upstream side, the catalyst(1) 1 promotes a steam reforming reaction and partial oxidation reaction to generate a hydrogen-rich reformed gas. This completes a series of processes.

Figure 12A:
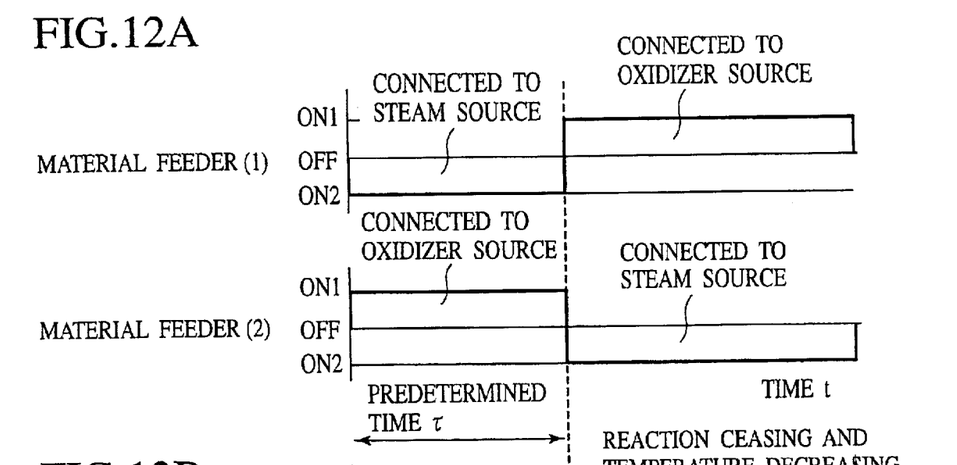
FIG. 12A shows temporal changes in the flows of oxidizer and steam according to the sixth embodiment.
Figure 12B:
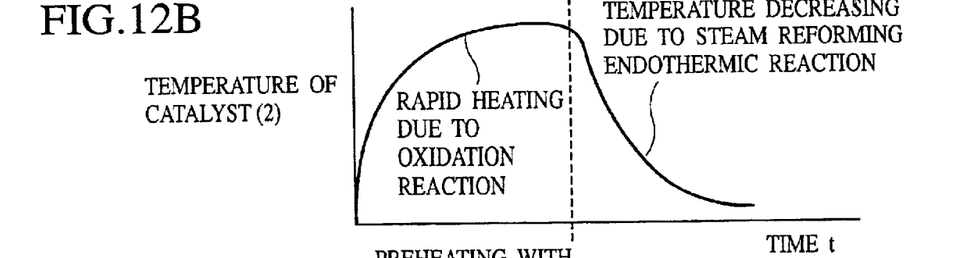
FIG. 12B shows temporal changes in the temperature of a catalyst(2) according to the sixth embodiment.
Figure 12C:
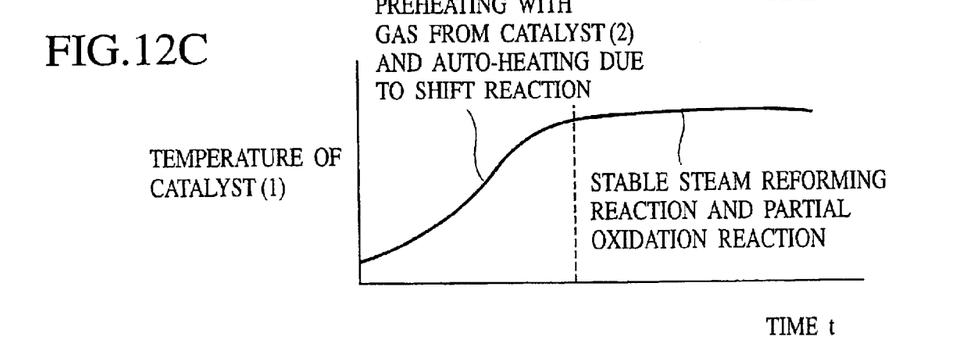
FIG. 12C shows temporal changes in the temperature of a catalyst(1) according to the sixth embodiment.

FIGS. 12A to 12C show temporal changes in the supply of oxidizer and steam and temporal changes in the temperatures of the catalysts (1) and (2) in the fuel reforming apparatus of the sixth embodiment. In FIG. 12A, "ON1" is an oxidizer source connected state, "ON2" a steam source connected state, and "OFF" a source disconnected state. In this way, the sixth embodiment integrates the oxidizer feeder(1)4 and steam feeder(1)7 of the first embodiment into the material feeder(1) 12, and the oxidizer feeder(2)5 and steam feeder(2)8 of the first embodiment into the material feeder(2) 13. As a result, the sixth embodiment not only realizes the operation and effect of the first embodiment but also reduces and simplifies the structure of the fuel reforming apparatus.

The timing of changing the accelerating operation (or a startup operation) to the steady operation is determined according to whether or not the temperature of the catalyst (1) 1 has reached a threshold temperature Tc at which the catalyst(1) 1 stably achieves a steam reforming reaction and partial oxidation reaction. Instead of the configuration that checks the predetermined time τ to switch the oxidizer control valve 6 and steam control valve 9, the sixth embodiment may employ the temperature sensor 11a and temperature measuring unit 11 of any one of the second to fifth embodiments, to measure the temperature of a specified location and switch the control valves 6 and 9 if the measured temperature has reached a set value.

The entire content of a Japanese Patent Applications No. 2000-165098, filed on Jun. 1, 2000 is hereby incorporated by reference. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel reforming apparatus for simultaneously achieving a steam ref arming reaction that produces hydrogen from a hydrocarbon and steam and a partial oxidation reaction that produces hydrogen from the hydrocarbon and an oxidizer and using heat generated by the partial oxidation reaction that is an exothermicreaction to cover heat for the steam reforming reaction that is an endothermic reaction, comprising:

a first catalyst with a support, for promoting the steam reforming reaction and partial oxidation reaction, a second catalyst with a support positioned upstream from the first catalyst, for promoting the partial oxidation reaction;

fuel feeding means for feeding the hydrocarbon as a fuel upstream from the second catalyst;

first oxidizer feeding the means for feeding the oxidizer to the first catalyst;

second oxidizer feeding means for feeding the oxidizer to the second catalyst;

oxidizer controlling means for selectively supplying the oxidizer from an oxidizer source to one of the first and second oxidizer feeding means;

first steam feeding means for feeding steam to the first catalyst;

second steam feeding means for feeding steam to the second catalyst;

steam controlling means for selectively supplying steam from a steam source to one of the first and second steam feeding means; and master controlling means for controlling the oxidizer controlling means and steam controlling means, wherein:

the master controlling means has first and second states, to control the oxidizer controlling means has first and second states, means in such a manner as to connect, in the first state, the oxidizer source to the second oxidizer feeding means and the steam source to the first steam feeding means, and in the second state, the oxidizer source to the first oxidizer feeding means and the steam source to the second steam feeding means; and the master controlling means is in the first state during startup and transient operations and is in the second state during to other operations.

2. The apparatus of claim 1, wherein the master controlling means is switched to the second state after it is maintained in the first state for a predetermined period.

3. The apparatus of claim 1, further comprising:

temperature measuring means for measuring a temperature of the first catalyst and sending an output to the master controlling means, wherein:

the master controlling means is switched from the first state to the second state if the output from the temperature measuring means is equal to a predetermined value.

4. A fuel reforming apparatus for simultaneously achieving a steam reforming reaction that produces hydrogen from a hydrocarbon and steals and a partial oxidation reaction that produces hydrogen from the hydrocarbon and an oxidizer and using heat generated by the partial oxidation reaction that is an exothermic reaction to cover heat for the steam reforming reaction that is an endothermic reaction comprising:

a first catalyst with a support, for promoting the steam reforming reaction and partial oxidation reaction;

a second catalyst with a support positioned upstream from the first catalyst, for promoting the partial oxidation reaction;

fuel feeding means for feeding the hydrocarbon as a fuel upstream from the second catalyst;

first material feeding means for feeding one of the oxidizer and steam to the first catalyst;

second material feeding means for feeding one of the oxidizer and steam to the second catalyst;

oxidizer controlling means for selectively supplying the oxidizer from an oxidizer source to one of the first and second material feeding means;

steam controlling means for selectively supplying steam from a steam source to one of the first and second material feeding means; and master controlling means for controlling the oxidizer controlling means and steam controlling means, wherein:

the master controlling means has first and second states, to control the oxidizer controlling means and steam controlling means in such a manner as to connect, in the first state, the oxidizer source to the second material feeding means and the steam source to the first material feeding means, and in the second state, the oxidizer source to the first material feeding means and the steam source to the second material feeding means; and the master controlling means is in the first state during startup and transient operations and is in the second state during the other operations.

5. The apparatus of claim 4, further comprising:

temperature measuring means for measuring a temperature of the first catalyst and sending an output to the master controlling means, wherein the master controlling means is switched from the first state to the second state if the output from the temperature measuring means is equal to a predetermined value.

6. The apparatus of claim 3, wherein the temperature measuring means at least measures the temperature of a predetermined location in a gas passage on the inlet side of the first catalyst.

7. The apparatus of claim 3, wherein the temperature measuring means at least measures the temperature of an inside location of the first catalyst.

8. The apparatus of claim 3, wherein the temperature measuring means at least measures the temperature of a predetermined location in a gas passage on the outlet side of the first catalyst.

9. The apparatus of claim 1, wherein the hydrocarbon is methanol; and each of the first and second catalysts is one of a copper-based catalyst and a palladium-based catalyst.

10. The apparatus of claim 1, wherein the hydrocarbon is methanol; and the first catalyst is one of a copper-based catalyst and a palladium-based catalyst; and the second catalyst is an oxidation catalyst.

11. The apparatus of claim 5, wherein the temperature measuring means at least measures the temperature of a predetermined location in a gas passage on the inlet side of the first catalyst.

12. The apparatus of claim 5, wherein the temperature measuring means at least measures the temperature on an inside location of the first catalyst.

13. The apparatus of claim 5, wherein the temperature measuring means at least measures the temperature of a predetermined location in a gas passage on the outlet side of the first catalyst.

14. The apparatus of claim 4, wherein the hydrocarbon is methanol; and each of the first and second catalysts is one of a copper-based catalyst and a palladium-based catalyst.

15. The apparatus of claim 4, wherein the hydrocarbon is methanol; and the first catalyst is one of a copper-based catalyst and a palladium-based catalyst; and the second catalyst is an oxidation catalyst.

* * * * *